Oct. 8, 1935.   C. S. BARON   2,016,980
CONTAINER
Filed Oct. 6, 1933   2 Sheets-Sheet 1
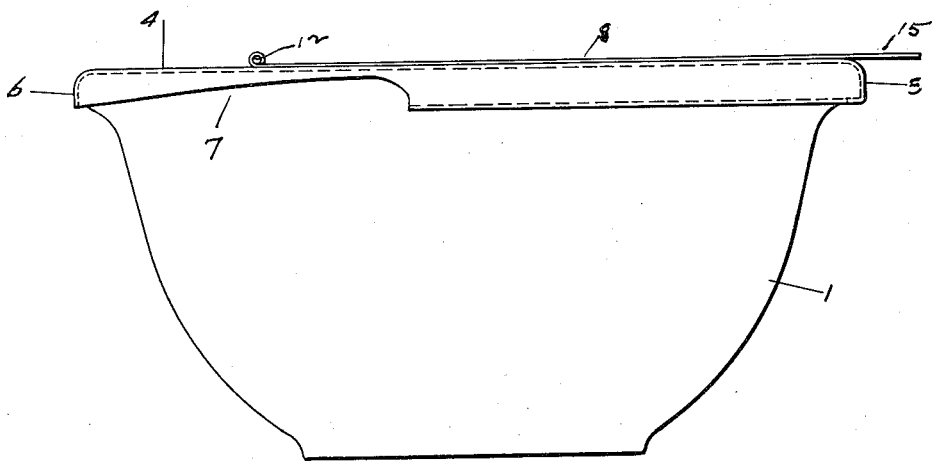
Fig. I
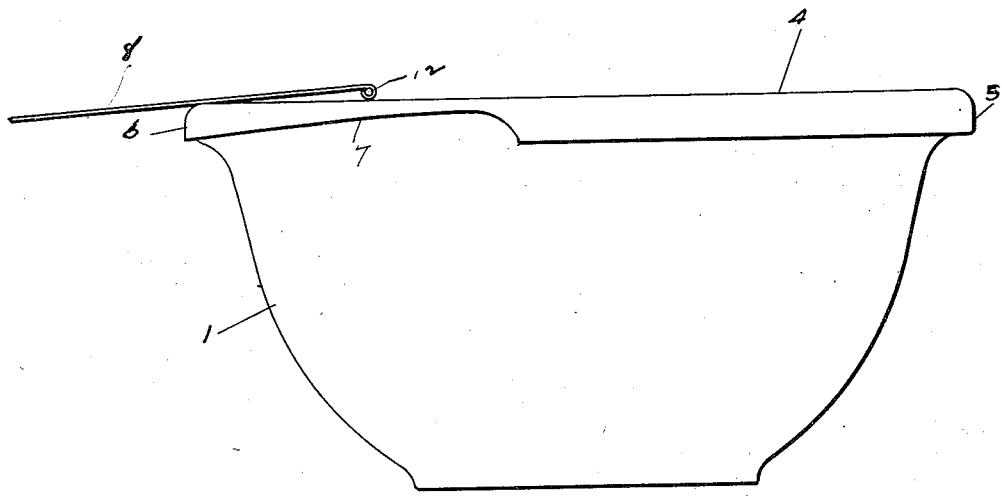
Fig. II
Inventor:
Charles S. Baron
By Atkins & Atkins
Attorneys.

Oct. 8, 1935.  C. S. BARON  2,016,980
CONTAINER
Filed Oct. 6, 1933   2 Sheets-Sheet 2
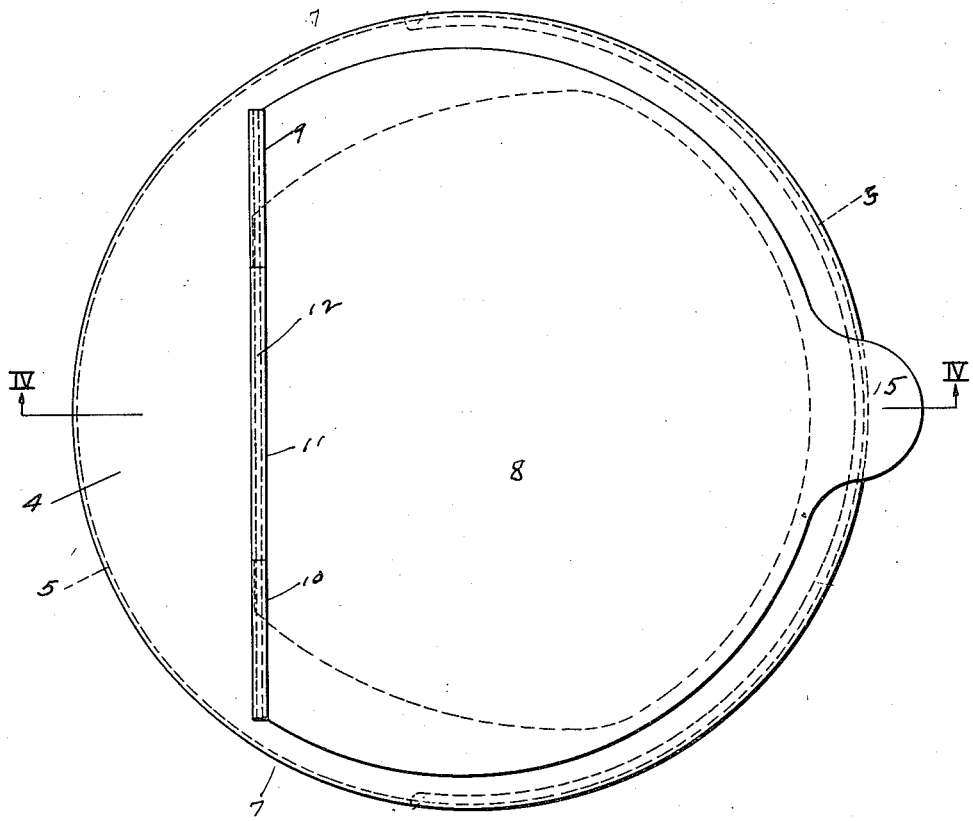
Fig. III
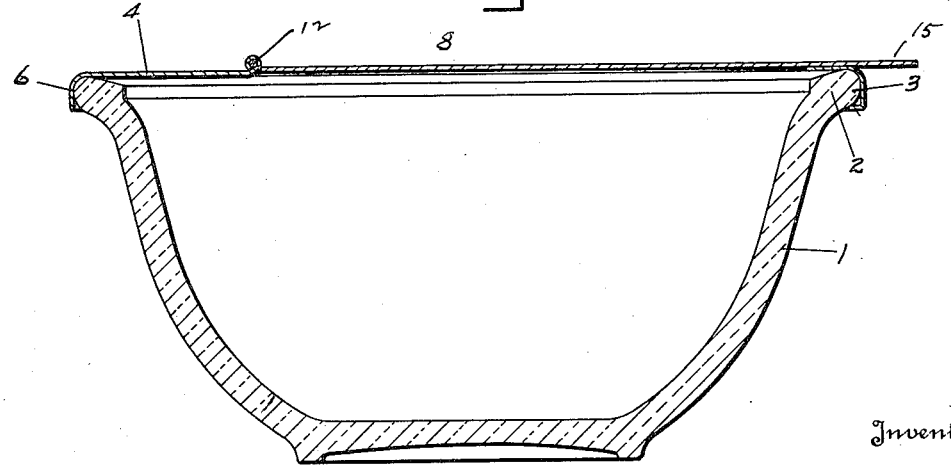
Fig. IV
Inventor:
Charles S. Baron
By Atkins & Atkins
Attorneys Patented Oct. 8, 1935

2,016,980

UNITED STATES PATENT OFFICE 2,016,980

CONTAINER

Charles S. Baron, Tiffin, Ohio

Application October 6, 1933, Serial No. 692,525

7 Claims. (Cl. 65—60)

This invention relates to containers for substances of all kinds ranging from liquid to dry, and is exemplified in salt boxes for culinary or the like uses as shown herein. In the form of embodiment illustrated herein, my invention consists in a bowl of glass or any other suitable material, provided with a hinged top fastened to a cover which is detachably secured to the bowl by means which admit of its convenient separation therefrom whenever occasion may demand, as for instance, in washing the utensil.

What constitutes my invention will be hereinafter described in detail and succinctly defined in the appended claims.

In the accompanying drawings, in which my invention is shown in a present preferred form of embodiment, Figure I is a side elevation of a container with the top closed.

Figure II is a similar view of the same with an open top, partly broken away.

Figure III is a top plan view of the subject matter of Figure I.

Figure IV is a section on the line IV—IV of Figure III to illustrate the preferred form of hinge for uniting the cover and the top.

Referring to the numerals on the drawings, 1 indicates a bowl or the like hollow body, which may be made of glass or any other suitable material that may be of any preferred shape and of any preferred size and dimensions, at large or in relatively correlated details.

In the form illustrated, the bowl 1 is surmounted by what may be denominated a mouth-defining rim 2. The rim 2 is circumferentially bounded by a preferably integral flange 3. The flange 3 is shown as extending outwardly from the bowl, but it may be obviously transposed to extend inwardly thereof instead of outwardly.

Surmounting the mouth-defining rim 2 and flange 3, is provided a conveniently detachable cover 4, in respect to which broadly, the means for securing it to the bowl may be regarded as an important and perhaps the chief distinguishing feature of my invention.

The cover, as illustrated and as preferred in the manufacture of my device, is made of metal and of skeleton shape conformable in diameter to the flange 3. The opening defined by the cover 4, that is superposed above the mouth defined by the rim 2 is, in the form of embodiment of my invention illustrated, large enough to permit the introduction through it of a large spoon, for example, or even of the hand of an operator; but the employment of a cover extending over the entire flange 3 and so constituting a solid cover for the bowl 1, is contemplated within the wider limits of my invention.

In some forms of embodiment of my invention the cover may be foraminated as are salt shakers in ordinary use. In all forms of the cover 4, its characteristic feature is found in means by which it is made conveniently attachable to and detachable from the bowl 1. The means for that purpose which are at present preferred, consists of a prehensile flange 5 that depends from the periphery of the cover. The flange 5 as well as the lip 6 indicated below is denominated prehensile because each is curved or otherwise shaped in such manner as to catch and hold that form of flange 3 which it is designed and adapted to engage.

The cover 4 is made, for example, of what is denominated in the commercial art, good semi-spring quality of metal which by its resiliency not only adapts it for the functioning capacity required of it, but also imparts to it a spring action for automatic operation of the fastening mechanism or clip hereinafter specified.

In assembling the cover with the bowl, the former is made slidable athwart the normal median or vertical axis of the bowl. To that end, the flange 5 extends, as shown for example in Figures I and II, approximately not more than half way around the flange 3 when the cover 4 is assembled therewith. Consequently, a sliding engagement between the said members is made readily permissible. Without other provision, such sliding engagement would suffice only to hold the flanges together against a force acting in the direction of the vertical axis of the bowl to pull them apart. Therefore, in order to resist all forces that might tend to separate the conjoined cover and the bowl, I provide, also, upon the side of the cover that is disposed diametrically opposite that on which the middle of the flange 5 is located, a stop-piece which will resist reversal of the reciprocal sliding movement of the flanges 3 and 5 by which they are in their assemblement fastened together in the manner above described. Such stop-piece may consist of any properly operative snap acting member, but I prefer, for substantial considerations, to employ for the purpose indicated a prehensile lip 6 above referred to whose terminals extend in an inclined preferably curvilinear direction, substantially from one end to the other of the flange 5, respectively indicated at 7.

In operation, when the cover 4 is pushed transversely upon the flange 3, the inclined portion 7 of the lip 6 rides upon the smooth upper face of the flange 3, thereby lifting the lip 6 so as to cause it to clear said flange until, when the lip clears the flange, the resiliency of the cover automatically causes the lip to snap over and catch upon the said flange, thereby securely uniting the flange 3 with the cover.

In detaching those last named members one from the other, it is necessary only to manipulate the lip sufficiently by lifting the lip to permit that sliding retraction of the cover from the flange 3 which the lip normally opposes.

8 indicates a top that is hinged to the cover 4 by a longitudinally extended hinge consisting preferably of two outside knuckles 9 and 10 and an intermediate knuckle 11. The said knuckles are preferably made integral with the cover and top, respectively, by shaping a surplus of metal provided thereon for the purpose. 12 indicates a pintle which, being common to all the knuckles, serves to complete the hinge effect desired.

On the free end of the top an extension is preferably provided to constitute a simple form of handle extending over the cover as indicated at 15 in Figures I, III and IV.

It is observed to be a condition of important practical advantage that the diameters of the flanges 3 and 5 which effect engagement of those members need not correspond with exactitude. Consequently, small plus or minus variation of the said two diameters is permissible in manufacture and will not affect the fit of the correlated members of slightly deviating sizes. It will be seen that my improved cover provides an attractive and sanitary removable closure in which the flange 5 and the lips 6 constitute a smooth one piece skirt and are so formed as to preserve or retain as much of the metal skirt surrounding the edge of the bowl or container as possible. In other words, the skirt is cut away just enough to retain a complete bead effect and to allow the cover to slide longitudinally or transversely across the top of the bowl to permit the automatic latching of the lip with the flange or shoulder 3.

The operation of my device, in view of the foregoing specification, is deemed to require no further description to render it perfectly intelligible to one skilled in the art.

What I claim is:

1. The combination with a hollow container having a mouth defining rim, of a slidable cover including a depending skirt comprising a prehensile flanged portion extending substantially half way around the periphery of the skirt, the remaining portion of the skirt being formed with a resilient lip having inclined sides tapered off adjacent the ends of the flange portion whereby to permit the cover to be slid transversely across the top of the container to bring the lip into automatic locking engagement with the rim.

2. The combination with a hollow container having a mouth defining rim, of a slidable cover including a depending smooth skirt having a prehensile flanged portion extending substantially half way around the periphery of the cover and arranged releasably to engage the rim, the remaining portion of the skirt being provided with a resilient lip having inclined edges tapered off adjacent the ends of the flange portion and with its maximum width at a point substantially opposite the middle of the flange portion whereby to permit the cover to be slid transversely across the top of the container to bring the lip into automatic locking engagement with the rim.

3. The combination with a hollow container body having a mouth defining rim, of a slidable cover including a depending curved prehensile flange extending substantially half way around the periphery of the cover and arranged to slidably engage under the rim, a resilient lip extending from the cover approximately opposite to the middle of the flange and arranged to detachably connect the cover to the container, said lip having oppositely disposed circumferential portions each of continuously decreasing area operable upon the initial application of the cover to the rim to raise the lip until it rises over the rim.

4. As a new article of manufacture a cover having a depending skirt comprising a prehensile flanged portion extending substantially half way around the periphery of the skirt, the remaining portion of the skirt being formed with a resilient lip having inclined circumferentially disposed sides tapered off adjacent the ends of the flange portion to facilitate the application of the cover to a container.

5. The combination with a hollow container body having a mouth defining rim, of a cover having a depending prehensile flange arranged to engage the rim on one side thereof, said cover being provided on the other side with a resilient member extending from one end to the other of said flange, and said member having inclined portions arranged to ride upon the rim under sliding impulse imparted to the cover whereby to provide means for slidably applying and removing the cover from the container.

6. The combination with a hollow container body having a mouth defining rim, of a resilient cover having a depending prehensile flange arranged to engage the rim on one side thereof, said cover provided with a prehensile lip on the side opposite to that upon which the flange is located, and said lip terminating in inclined portions converging toward the adjacent ends of the flange, whereby when the cover is applied to the container, the lip is initially raised by engagement of the inclined sides with the container and subsequently is brought into yieldable clamping engagement with the rim.

7. The combination with a hollow container body having a mouth defining rim, of a resilient cover having a depending interrupted flange arranged to engage the rim on one side thereof, said cover provided with a prehensile lip on the side opposite to that upon which the flange is located, and said lip terminating in circumferentially extending inclined portions each of continuously decreasing area arranged upon initial engagement with the rim to raise the lip to maintain it out of engagement with the container until the lip clears the rim.

CHARLES S. BARON.